(12) United States Patent
Tiainen

(10) Patent No.: US 6,771,959 B1
(45) Date of Patent: Aug. 3, 2004

(54) TRANSMITTING CALL-RELATED DATA BETWEEN SWITCHING CENTRES

(75) Inventor: Vesa Tiainen, Vantaa (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/787,276
(22) PCT Filed: Sep. 16, 1999
(86) PCT No.: PCT/FI99/00762
§ 371 (c)(1), (2), (4) Date: Apr. 23, 2001
(87) PCT Pub. No.: WO00/16567
PCT Pub. Date: Mar. 23, 2000

(30) Foreign Application Priority Data

Sep. 16, 1998 (FI) .................................................. 981999

(51) Int. Cl.$^7$ ................................................ H04Q 7/20
(52) U.S. Cl. ..................... 455/433; 455/432.1; 455/445
(58) Field of Search ........................... 455/432.1, 432.2, 455/433, 455

(56) References Cited

U.S. PATENT DOCUMENTS

| 5,818,919 A | 10/1998 | Berberich, Jr. et al. | |
| 5,905,954 A | * 5/1999 | Nguyen ....................... | 455/433 |
| 6,466,786 B1 | * 10/2002 | Wallenius ................... | 455/433 |
| 6,490,449 B1 | * 12/2002 | Thibert et al. ............... | 455/433 |

FOREIGN PATENT DOCUMENTS

| WO | WO 96/13949 | 5/1996 |
| WO | WO 97/44981 | 11/1997 |
| WO | WO 98/25426 | 6/1998 |
| WO | WO 99/57917 | 11/1999 |

* cited by examiner

Primary Examiner—Vivian Chin
Assistant Examiner—Minh Dao
(74) Attorney, Agent, or Firm—Pillsbury Winthrop LLP

(57) ABSTRACT

A method for transmitting a call parameter, such as the identifier (A#) of an A subscriber, to a first switching centre (GMSC) from a second switching centre (VMSC) serving the terminal (MS) of an A subscriber, when both switching centres (GMSC, VMSC) are connected to an intelligent network service control point (SCP). The second switching centre (VMSC) receives from the A subscriber a call set-up request (2) to set up a call through the first switching centre (GMSC). The second switching centre (VMSC) transmits to the service control point (SCP) an intelligent network service initiation message (4) which contains the call parameter (A#). The service control point saves (6) into its memory the call parameter (A#) to wait for a second intelligent network service initiation message (12) associated with the same call. The second switching centre (VMSC) routes (10) the call to the first switching centre (GMSC). The first switching centre (GMSC) transmits to the service control point (SCP) a second intelligent network service initiation request (12). The service control point (SCP) retrieves from its memory (14) the call parameter (A#) and transmits (16) it to the first switching centre (GMSC).

11 Claims, 1 Drawing Sheet

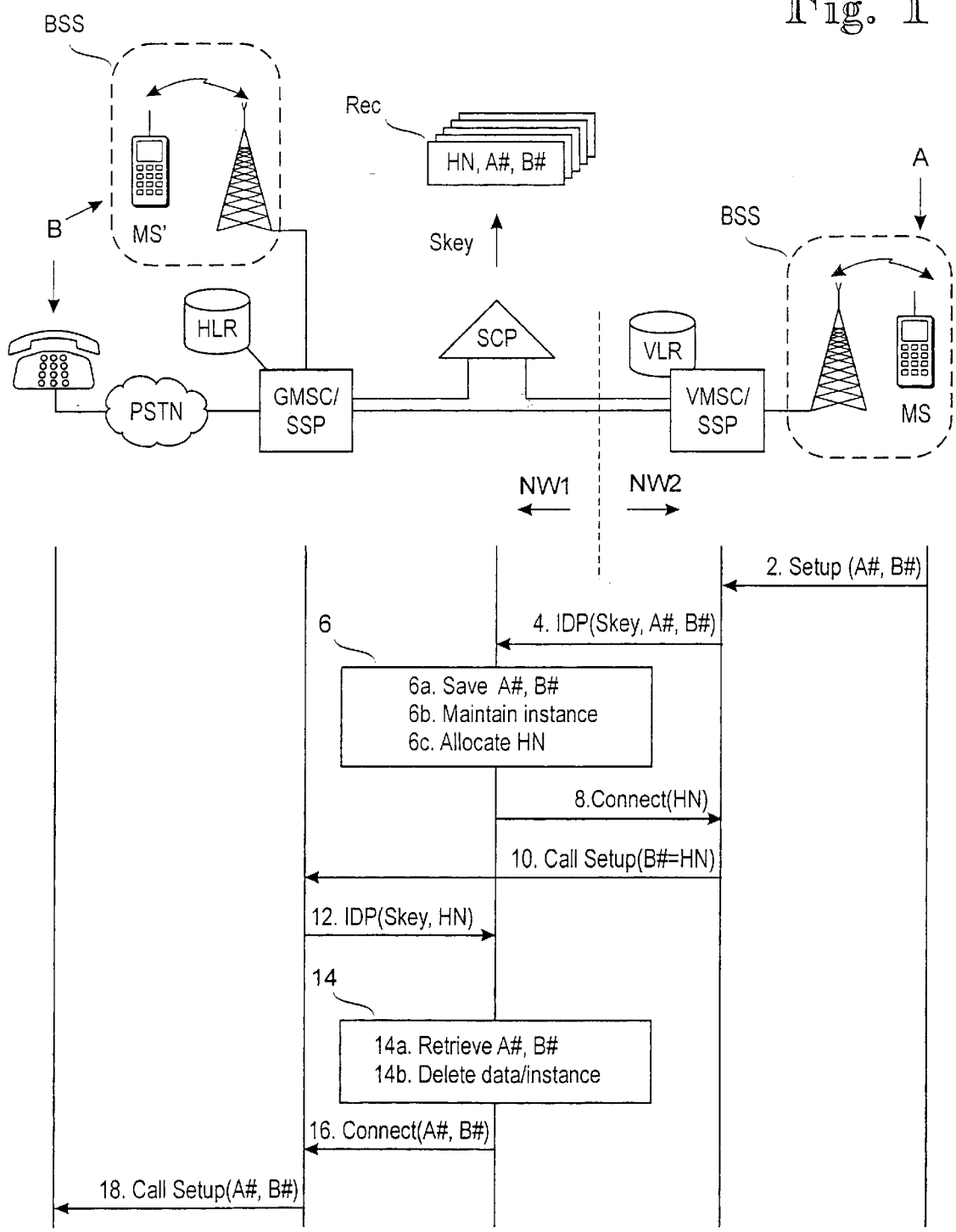

TRANSMITTING CALL-RELATED DATA BETWEEN SWITCHING CENTRES

This application is the national phase of international application PCT/FI99/00762 filed Sep. 16, 1999 which designated the U.S.

BACKGROUND OF THE INVENTION

The invention relates to a method for transmitting call-related data, i.e. a call parameter, between switching centres. Additionally, the invention relates to a switching centre and an intelligent network service control point to support the function in question. The transmission of the mobile station identifier of the subscriber initiating the call, i.e. the A subscriber, to a first switching centre in the home network, when the A subscriber roams in a visited network, is described as a primary example of such a technique.

With reference to FIG. 1, in mobile systems, for instance in the GSM system, a technique is used whereby the number of the A subscriber is transmitted to the terminal of the B subscriber during call set-up. The B subscriber can decide on the basis of the number, whether s/he answers the call or not. The mobile station can improve this function by converting the number of the A subscriber into a name, if the name and number combination in question is stored in the memory of the mobile station.

A problem with the arrangement described above is, for instance, that when the A subscriber roams in the area of a visited network NW2, the number of the A subscriber is usually not shown to the B subscriber in the home network NW1, or at least this requires separate agreements between the operators. A concurrent problem is that the A subscriber roaming in the visited network NW2 cannot without separate authentication (identification) listen to the messages accumulated in his/her voice mail box, because the identifier of the A subscriber is not transmitted during call set-up from the visited network NW2 to the home network NW1. Another concurrent problem is that a subscriber roaming in a visited network cannot use number translation services, such as the private numbering service (PNS) or short number service. Within the scope of this application, B subscriber can refer to either an actual subscriber/terminal or a service, such as listening to a voice mail box.

BRIEF DESCRIPTION OF THE INVENTION

Thus, it is an object of the invention to develop a method and an apparatus implementing the method for transmitting the identifier (such as a number or name) of the A subscriber to the switching centre serving the B subscriber in the home network or to a switching centre providing the corresponding service, independent of any separate agreements between operators. The object of the invention is achieved by a method and an apparatus characterized by what is disclosed in the independent claims. Preferred embodiments of the invention are set forth in the dependent claims.

A simple solution would be to define a standard according to which the identifier of the A subscriber must also be transmitted in the a set-up message between the networks or operators.

In spite of its apparent simplicity, this approach has, however, proved to be astonishingly difficult, maybe because several operators have made separate agreements that differ from each other and the operators are reluctant to lay them aside for the good of a common standard.

The invention is based on the idea that call set-up is supplemented by means of intelligent network technology. The switching centre of the home network NW1 is referred to as the first switching centre and the switching centre in the visited network NW2 as the second switching centre. In a network element of an intelligent network, for instance a separate service control point SCP, an intelligent network service is located, which instructs said network element, in response to an intelligent network service initiation message received from a second switching centre, to save into its memory the A subscriber identifier (more generally: the data which should be transmitted to the first switching centre, but which according to prior art are not transmitted from one network to another), to allocate to the call in question an identifier, with which the saved data can later be found, and to transmit the identifier to the second switching centre. The identifier is preferably in the format of a telephone number and it is referred to as a homing number. The second switching centre transmits said identifier, i.e. homing number, to the first switching centre which, on the basis of it, retrieves the necessary data, such as the identifier of the A subscriber, from the service control point. The first switching centre can, as necessary, transmit the identifier of the A subscriber to a possible B subscriber or use it to implement the service, for instance to unload the voice mail box of the A subscriber.

The invention provides the advantage that the identifier of the A subscriber is not transmitted from a visited network to the home network in the call set-up message, but using intelligent network signalling, for instance in an intelligent network service initiation message. Intelligent network messages between networks are defined within the CAMEL (Common Applications for Mobile Enhanced Logic) protocol. Correspondingly, intelligent network messages inside networks are defined within the INAP (Intelligent Network Application Part) protocol. These protocols are sufficiently well standardised, which means that the network elements supporting them also support the transmission according to the invention of the A subscriber identifier between a visited network and the home network. The operators will thus not need several separate agreements differing from each other.

BRIEF DESCRIPTION OF THE DRAWING

In the following, the invention will be described in greater detail in connection with preferred embodiments and with reference to the attached drawing in which FIG. 1 shows the structure of a telecommunications system, the parts essential for understanding the invention and the signalling associated with the call set-up according to a preferred embodiment of the invention.

DETAILED DESCRIPTION OF THE INVENTION

FIG. 1 shows the structure of a telecommunications system. Let us assume that the called subscriber, i.e. the B subscriber (B) is in the area of a public switched telephone network PSTN. This is, however, just an assumption by way of example, the B subscriber could just as well be a mobile telephone network subscriber or a service in a telephone network or intelligent network, such as unloading a voice mail box. In this example, the first switching centre serving the B subscriber or implementing a service is a gateway mobile services switching centre GMSC. The mobile station of the calling subscriber, i.e. the A subscriber, is MS, his/her home network is NW1 and s/he roams in the area of a visited network NW2. There, s/he is served by a second switching centre VMSC which comprises a mobile switching centre MSC and a visitor location register VLR (VMSC=VLR+

MSC). The network element implementing the intelligent network service is called a service control point SCP. In FIG. 1, the SCP is a separate element, but it can also be integrated into a switching centre. The home location register HLR contains subscriber data of the mobile telephone network and information on which visitor location register VLR area the mobile subscriber is in.

FIG. 1 also shows the signalling associated with the call set-up according to a preferred embodiment of the invention. In step 2, the call set-up message SETUP arrives at a second switching centre VMSC in a visited network NW2. The parameters of the call set-up message comprise the identifiers A# and B#, for instance the ISDN or MSISDN numbers, of the A subscriber and the B subscriber/service. In step 4, the VMSC interrupts the conventional call set-up and requests further instructions from the intelligent network by transmitting to the service control point SCP an intelligent network service initiation message IDP (INITIAL DETECTION POINT) whose parameters comprise the identifiers A# and B# of the A and B subscriber and a service key Skey of the intelligent network, on the basis of which the SCP initiates a certain defined service. In step 6, the SCP allocates a number, referred to herein as homing number (HN), to the call in question. The essential issue is that the SCP associates the identifiers A# and B# of the A and B subscriber and the homing number HN with each other. This association is shown in FIG. 1 as records Rec, each of which includes a triplet formed by the homing number and the identifiers of the A and B subscriber. On the basis of the service key Skey, the SCP initiates the defined service in which it creates a new record Rec in step 6.

In step 8, the SCP transmits the homing number HN to the second switching centre VMSC. This is preferably done in a CONNECT message whose parameter comprises the homing number HN in question. The CONNECT message instructs the second switching centre VMSC in step 10 to transmit to the first switching centre GMSC a call set-up message CALL SETUP, which contains the homing number HN in question, preferably so that the identifier of the B subscriber is HN. The VMSC thus asks the GMSC to set up a call to the number HN.

The GMSC notices that the homing number HN is not a number of an actual subscriber and, in step 12, transmits to the control point SCP an intelligent network service initiation message IDP whose parameters comprise the homing number HN in question and the service key Skey of the intelligent network service in question. On the basis of the service key Skey, the SCP initiates the same service which was already mentioned in connection with step 6. On the basis of the homing number HN, the SCP finds the identifiers A# and B# of the A and B subscriber specifically associated with the call in question. At the same time, the SCP can delete from its memory the record Rec associated with the call in question.

In step 6, the homing number (HN) should preferably be allocated using a numbering scheme in which a number unambiguously indicates a service control point (SCP). Such numbering schemes are known to a person skilled in the art in connection with conventional switching centres. This way, in step 12, the GMSC already knows on the basis of the numbering scheme that this concerns a special number associated with an intelligent network service. Alternatively, the SCP could in connection with step 6 transmit an advance notice to the GMSC that a call set-up request to the homing number HN in question is on its way. However, using a suitable numbering scheme is a more elegant solution.

In step 14, the SCP retrieves the identifiers A# and B# of the A and B subscriber and then deletes them from its memory. In step 16, the SCP transmits to the GMSC the identifiers A#.and B# of the A and B subscriber, preferably in a CONNECT message whose parameters comprise the identifiers in question. On the basis of this, in step 18, the GMSC sets up a call to the B subscriber or a service. FIG. 1 shows a situation where the B subscriber is an actual fixed network PSTN subscriber. As already stated above, instead of the B subscriber, the call can be directed to a service in a telephone network or intelligent network, which would then be implemented in step 18.

The association of the homing number HN with the identifiers A# and B# of the A and B subscribers related to step 6 is one example of an intelligent network service. Intelligent network services are usually implemented using a re-entrant code, in which case the program code corresponding to each intelligent network service is loaded into the memory of the SCP only once. For each separate call, an instance, which contains the parameters, i.e. data, associated with the call in question, is generated of this intelligent network service. According to one preferred embodiment, in step 6, the SCP saves the instance in question into its memory, in which case it is already generated and waiting for the initiation/activation request, which is for instance the IDP, to be transmitted in step 12. In case the message of step 12 is not received, the waiting instance should preferably be defined a maximum duration, for instance 1 minute.

The technique, in which the SCP saves into its memory the instance in question to wait for a future intelligent network service initiation/activation request, can also be used in other connections. This technique can be used to transmit call-related information which cannot be transmitted in signalling. An example of such information is the dialling used by the A subscriber. If the A subscriber using a number translation service calls to a B subscriber in the area of a different switching centre, the original dialling of the A subscriber is lost underway. Similarly, the information on whether the A subscriber has used a short number, an ISDN number or an MSISDN number, is lost. This information can be utilised when implementing corporate virtual networks, for instance, so that when using a short number, the A subscriber is assumed to want to pay for the call inside the virtual network only. If the A subscriber then dials an ISDN number, it is assumed that s/he wants to pay for the call, if the B subscriber is in the area of the home network. If the A subscriber dials an MSISDN number, it is assumed that s/he wants to reach the B subscriber wherever s/he is. With the technique of the invention, the dialling used by the A subscriber can be transmitted to the switching centre serving the B subscriber, which preferably saves the instance in question into its memory to wait for an intelligent network service activation request associated with a future call.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for transmitting a call parameter, including an identifier of an A subscriber to a first switching centre from a second switching centre serving a terminal of the A subscriber, when both switching centres are connected to an intelligent network service control point;

in which method, the second switching centre receives from the terminal of the A subscriber a call set-up request to set up a call through the first switching centre; characterized in that the second switching centre transmits to the service control point an intelligent network service initiation message containing or indicating said call parameter;

the service control point saves into its memory at least said call parameter to wait for a second intelligent network service initiation message associated with the same call;

the second switching centre routes the call to the first switching centre;

the first switching centre transmits to the service control point the second intelligent network service initiation request; and the service control point transmits to the first switching centre said call parameter.

2. A method as claimed in claim 1, characterized in that the service control point generates a separate instance, for each separate call and when saving said call parameter, the control point also saves said instance to wait for said second initiation message.

3. A method as claimed in claim 1, characterized in that said call parameter contains the identifier of the A subscriber.

4. A method as claimed in claim 1, characterized in that said call parameter contains the dialling used by the A subscriber.

5. A method as claimed in claim 1, characterized in that when saving said call parameter, the service control point allocates to the call in question a homing number (HN) and transmits it to the second switching centre which transmits it to the first switching centre in connection with said routing; and the second intelligent network service initiation message contains the homing number in question, on the basis of which the service control point finds said call parameter from its memory.

6. A method as claimed in claim 5, characterized in that the homing number is allocated using a numbering scheme in which one number unambiguously indicates the service control point.

7. An intelligent network service point which, to support a call-related service, comprises at least one intelligent network service with which a predefined first initiation message and a service key is associated, characterized in that to transmit the call parameter to a first switching centre from a second switching centre serving a terminal of an A subscriber, said intelligent network service is adapted to instruct the service control point:

as a response to the reception of the first initiation message and service key from the second switching centre, to save into its memory at least said call parameter to wait for a second intelligent network service initiation message associated with the same call from the first switching centre, and as a response to the second initiation message to retrieve from its memory and to transmit to the first switching centre said call parameter.

8. A service control point as claimed in claim 7, characterized in that:

said intelligent network service instructs the service control point to allocate to the call in question a homing number and to transmit it to the second switching centre, and the second initiation message contains or indicates said homing number and said retrieval of the call parameter from memory and its transmission is done on the basis of the homing number.

9. A service control point as claimed in claim 7, characterized in that the control point is adapted to generate a separate instance for each separate call, and that in connection with said saving of the call parameter the service control point is adapted to save said instance to wait for the second initiation message.

10. A service control point as claimed in claim 9, characterized in that it is adapted to set a maximum duration for said instance and to remove from its memory said instance unless the service control point receives said second initiation message during the maximum duration.

11. A mobile switching centre adapted to serve an A subscriber roaming in a visited network and to receive from it a call set-up request to set up a call to a B subscriber/service, characterized in that to transmit a call parameter to a switching centre of the home network of the A subscriber, the mobile switching centre is adapted, as a response to said call set-up request:

to transmit to an intelligent network service control point an intelligent network service initiation message containing or indicating said call parameter and an identifier of the B subscriber/service and a service key indicating an intelligent network service which makes the service control point to save into its memory at least said call parameter and to allocate a homing number, and to receive from the control point the homing number and to transmit it to the switching centre of the A subscriber home network.

* * * * *